H. F. MORSE.
Improvement in Dough Boards.

No. 125,208.  Patented April 2, 1872.

Witnesses.
S. N. Piper
L. N. Mason

Harris F. Morse.
by his attorney.
R. H. Eddy

UNITED STATES PATENT OFFICE.

HARRIS F. MORSE, OF MANCHESTER, NEW HAMPSHIRE, ASSIGNOR TO HIMSELF AND CHARLES TREFETHEN, OF SAME PLACE.

IMPROVEMENT IN DOUGH-BOARDS.

Specification forming part of Letters Patent No. 125,208, dated April 2, 1872.

*To all persons to whom these presents may come:*

Be it known that I, HARRIS F. MORSE, of Manchester, of the county of Hillsborough and State of New Hampshire, have invented a new article of manufacture for culinary purposes, and which I term a "Folding Dough-Board and Spice-Holder;" and do hereby declare the same to be fully described in the following specification and represented in the accompanying drawing, of which—

Figure 1:
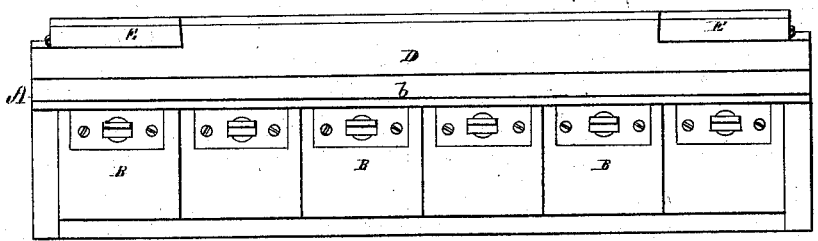
Figure 2:
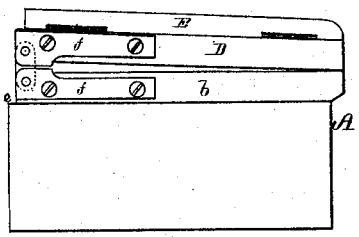
Figure 3:
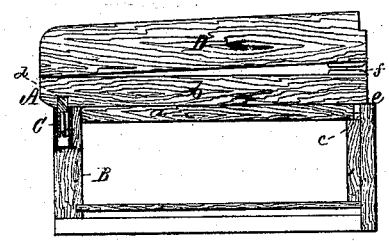
Figure 4:
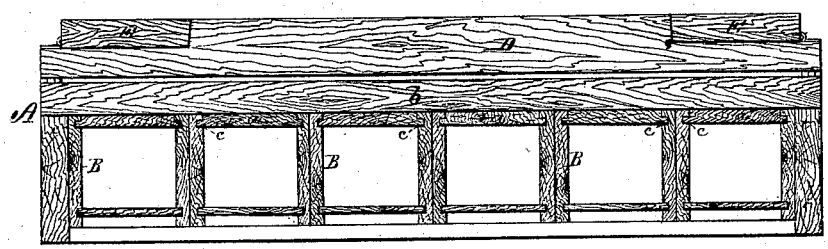

Figure 1 is a front view of it in a folded state; Fig. 2, an end elevation; Fig. 3, a transverse section; and Fig. 4, a longitudinal section of it.

The purpose of the article is to facilitate the mixing of dough and its conversion into cakes or bread, and to constitute a portable and convenient means of holding the spices and flavoring substances generally employed in the making of cakes or bread.

In the drawing, A denotes a table or frame, which in practice is to be about three inches in height, and to be supplied with a series of drawers, B B B, arranged within it, as shown, each being applied to the table or frame so as to be capable of being slid into and drawn out from the same as a drawer usually operates relatively to a common table. Each drawer is shown as supported on a dovetail or T-piece, *a*, fastened to the lower surface of the table-top *b*, and extended into grooves *c c*, made in opposite sides of the drawer, the part *a* serving also not only as a cover to the drawer when the latter is closed, but as a stop to arrest the drawer at its proper position while being closed. Each drawer may have a lock, or a spring-bolt or catch, *c*, applied to it to hold it closed, and to operate with a mortise made in or a catch plate, *d*, suitably applied to the part A. Furthermore, the said part A has a solid top, *b*, and is rabbeted at its back as shown at *e*, and there has connected to its top, by hinges *f f*, a board, D, of equal or about equal size with the top *b*, the depth of the rabbet being equal to the thickness of the board D. To such board D two short legs, E E, are hinged, they being arranged as shown. When turned over into the same plane with the table-top the board D will rest on the bottom of the rabbet, and may be otherwise supported—viz., on a table or bench—by the legs E, turned down at right angles with the board. For convenience of stowage, or to cause the article to occupy less space, the board D is to be folded over and upon the table-top, and the legs turned down upon the board. The rabbet serves to prevent the hinges from being strained, or their screws from becoming detached or loosened by pressure exerted on the board D while the article may be in use, or a person may be kneading, mixing, or cutting dough on it.

With the said article a cook, while making or working dough in it, will always have her spices and salt at hand or convenient for use, as occasion may require.

I claim as my invention—

The new manufacture or combined folding dough-board and spice-holder, constituted substantially as described, consisting of the rabbeted table or frame A, the series of drawers B, their supporting covers *a*, and the hinged board D and its folding legs E, all arranged as specified.

HARRIS F. MORSE.

Witnesses:
FRANK HILAND,
ISAAC L. HEATH.